(12) United States Patent
Tate et al.

(10) Patent No.: US 10,309,465 B2
(45) Date of Patent: Jun. 4, 2019

(54) SEALING ASSEMBLY FOR A CUP BEARING OF A UNIVERSAL JOINT

(71) Applicant: Schaeffler Technologies AG & Co. KG, Herzogenaurach (DE)

(72) Inventors: John Tate, Cornelius, NC (US); Seth Claus, Charlotte, NC (US); Tyler Boger, Farmington Hills, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 209 days.

(21) Appl. No.: 15/389,793

(22) Filed: Dec. 23, 2016

(65) Prior Publication Data

US 2018/0180102 A1 Jun. 28, 2018

(51) Int. Cl.
  *F16D 3/41* (2006.01)
  *F16D 3/38* (2006.01)
  *F16C 33/78* (2006.01)
  *F16C 43/04* (2006.01)
  *F16C 19/46* (2006.01)
  *F16C 33/58* (2006.01)

(52) U.S. Cl.
  CPC .......... *F16D 3/385* (2013.01); *F16C 19/466* (2013.01); *F16C 33/586* (2013.01); *F16C 33/7809* (2013.01); *F16C 33/7826* (2013.01); *F16C 33/7876* (2013.01); *F16C 33/7896* (2013.01); *F16C 43/045* (2013.01); *F16C 2226/74* (2013.01); *F16C 2361/41* (2013.01); *F16D 2250/0084* (2013.01); *Y10T 29/49876* (2015.01)

(58) Field of Classification Search
  CPC .. F16D 3/385; F16D 2250/0084; F16C 43/02; F16C 33/74; Y10T 29/49876
  USPC ............ 464/131, 133; 277/309, 562, 572
  See application file for complete search history.

(56) References Cited

U.S. PATENT DOCUMENTS

| 2,834,616 | A | * | 5/1958 | Gebert | ............ F16C 33/78 |
| 4,576,382 | A | * | 3/1986 | Scharting | ........ F16C 33/7809 |
| | | | | | 464/131 X |
| 6,406,373 | B1 | | 6/2002 | Gibson | |
| 7,722,052 | B2 | * | 5/2010 | Oida | ............ F16J 15/3228 |
| | | | | | 277/562 X |

* cited by examiner

*Primary Examiner* — Greg Binda
(74) *Attorney, Agent, or Firm* — Volpe and Koenig, P.C.

(57) ABSTRACT

A sealing assembly for a cup bearing of a universal joint includes a seal sub-assembly configured to be positioned in a space between a cup of the cup bearing and a trunnion of the universal joint. The seal sub-assembly includes an elastic sealing member configured to contact an outer surface of the trunnion, and a seal insert attached to the elastic sealing member and configured to contact an inner surface of the cup. The seal insert includes an extension portion configured to contact and extend away from a rim surface of the cup. The sealing assembly further includes an external shield including an inner portion and an outer portion. The inner portion is configured to contact the outer surface of the trunnion, and the outer portion is attached to the extension portion of the seal insert.

15 Claims, 3 Drawing Sheets

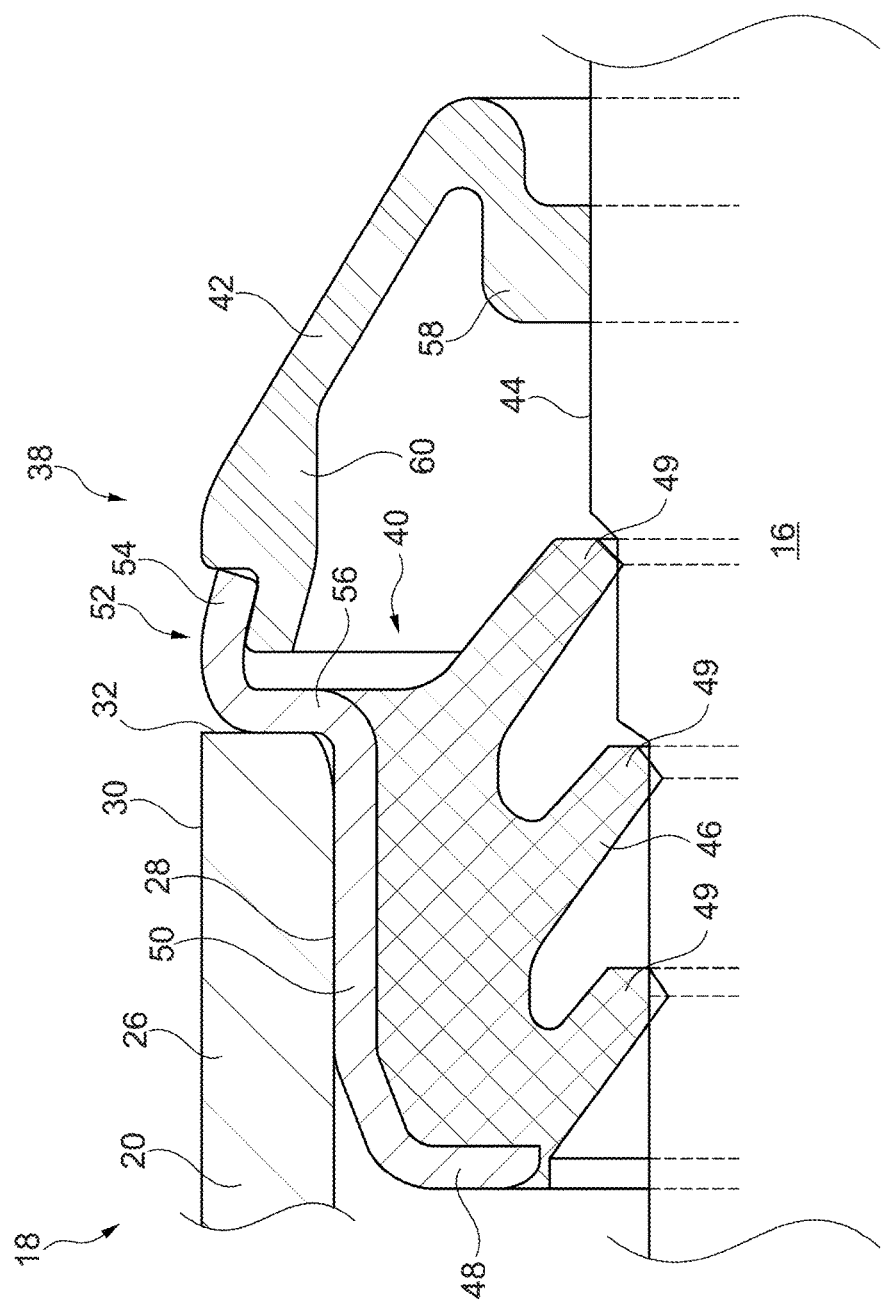

SEALING ASSEMBLY FOR A CUP BEARING OF A UNIVERSAL JOINT

FIELD OF INVENTION

The present invention relates to a sealing assembly, and, more particularly, to a sealing assembly for a cup bearing of a universal joint.

BACKGROUND

Universal joints are often used to connect an output shaft of an engine and a driveshaft, allowing the shafts to pivot in various directions relative to each other and rotate about unaligned axes of rotation. A conventional universal joint includes a cross member having a cup bearing attached at each of the four connection points. An example of a universal joint is described in U.S. Pat. No. 6,406,373 ("the '373 Patent").

One issue related to universal joints is the problem of foreign material and debris entering a space between the cup bearing and the cross member. This contamination of the bearing may lead to failure of the part. A sealing gasket having sealing lips is usually positioned between the ends of the cross member and the cup of the cup bearing in order to block foreign material and debris from entering. Some universal joints, such as the joint described in the '373 Patent, include an external shield to provide additional contamination protection.

In order for the external shield to be effective, it must be properly positioned at the interface of the cup bearing and the trunnion of the cross member. Current designs for external shields, however, do not provide an adequate positioning mechanism suitable for all cup bearing designs. For example, the external shield configuration described in the '373 Patent is compatible with thick-walled machined cup bearings which allow for flexibility in the shape of the cup, such as a machined groove for receiving a portion of the external shield. However, in applications that utilize a thin-walled drawn cup bearing, manufacturing and assembly constraints do not allow for the same method of interface with the cup.

The present disclosure is directed to overcoming these and other problems of the prior art.

SUMMARY

In one aspect, the present disclosure is directed to a sealing assembly for a cup bearing of a universal joint. The sealing assembly includes a seal sub-assembly configured to be positioned in a space between a cup of the cup bearing and a trunnion of the universal joint. The seal sub-assembly includes an elastic sealing member configured to contact an outer surface of the trunnion, and a seal insert attached to the elastic sealing member and configured to contact an inner surface of the cup. The seal insert includes an extension portion configured to contact and extend away from a rim surface of the cup. The sealing assembly further includes an external shield including an inner portion and an outer portion. The inner portion is configured to contact the outer surface of the trunnion, and the outer portion is attached to the extension portion of the seal insert.

In another aspect, the present disclosure is directed to a cup bearing for a universal joint. The cup bearing includes a cup including an end surface and a perimeter wall, the perimeter wall including an inner surface, an outer surface, and a rim surface. The cup bearing also includes a bearing element positioned in the cup, and a sealing assembly. The sealing assembly includes a seal sub-assembly configured to be positioned in a space between the cup and a trunnion of the universal joint. The seal sub-assembly includes an elastic sealing member configured to contact an outer surface of the trunnion, and a seal insert attached to the elastic sealing member and including a first axially-extending portion in contact with the inner surface of the cup and an extension portion in contact with and extending away from the rim surface of the cup. The sealing assembly further includes an external shield including an inner portion and an outer portion. The inner portion is configured to contact the outer surface of the trunnion, and the outer portion is attached to the extension portion of the seal insert.

In yet another aspect, the present disclosure is directed to a method of assembling a cup bearing for a universal joint. The method includes attaching an external shield to a seal sub-assembly, the seal sub-assembly comprising an elastic sealing member and a seal insert, including attaching an outer portion of the external shield to an extension portion of the seal insert. The method also includes inserting the seal sub-assembly into a cup having a perimeter wall until the seal insert contacts an inner surface and a rim surface of the perimeter wall. The extension portion bridges a gap between the rim surface and the external shield.

BRIEF DESCRIPTION OF THE DRAWING(S)

The foregoing Summary and the following detailed description will be better understood when read in conjunction with the appended drawings, which illustrate a preferred embodiment of the invention. In the drawings:

FIG. 3 is an enlarged cross-sectional view of a portion of the cup bearing of FIG. 2.

DETAILED DESCRIPTION OF THE PREFERRED EMBODIMENT(S)

Figure 1:
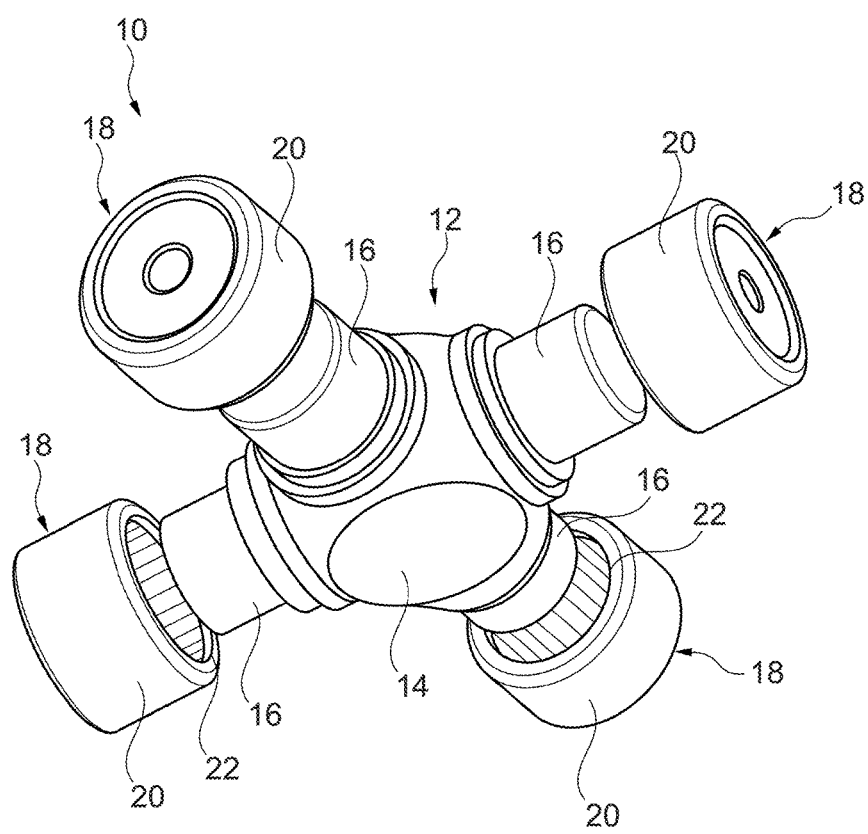
FIG. 1 is an exploded perspective view of a universal joint.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import FIG. 1 illustrates an exemplary universal joint 10. The universal joint 10 is configured to rotatably connect the ends of two shafts to each other, such as an output shaft and a driveshaft (not shown). The universal joint 10 includes a cross member 12. The cross member 12 includes a central body portion 14 and a plurality of trunnions 16 extending outwardly from the central body portion 14. For example, the cross member 12 preferably includes two perpendicularly-arranged pairs of trunnions 16.

The universal joint 10 further includes a plurality of cup bearings 18. The universal joint 10 preferably includes four cup bearings 18, one provided on each of the four trunnions 16. Each cup bearing 18 is configured to receive an end of a trunnion 16 and facilitate relative rotational movement between a coupling element (not shown) attached to the cup bearing 18 and the respective trunnion 16. For example, each cup bearing 18 includes a cup 20 and a bearing element 22 configured to facilitate relative motion between the cup 20 and the trunnion 16.

Figure 2:
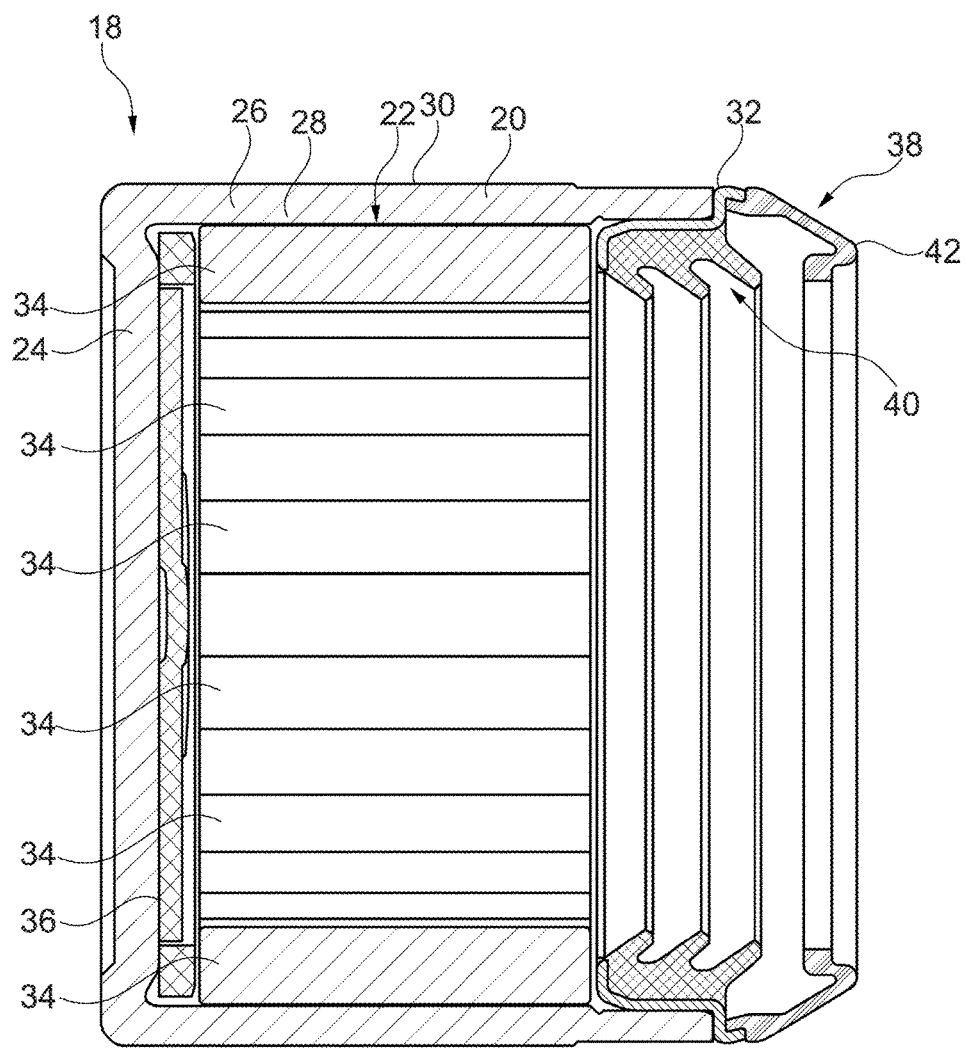
FIG. 2 is a cross-sectional view of a cup bearing of the universal joint of FIG. 1.

FIG. 2 further illustrates a cross-sectional view of an exemplary cup bearing 18, consistent with disclosed embodiments. The cup bearing 18 includes the cup 20 and the bearing element 22. The cup 20 includes an end surface 24 and a perimeter wall 26. The perimeter wall 26 defines an inner surface 28, an outer surface 30, and a rim surface 32. The cup 20 is preferably a thin-walled, drawn component. The bearing element 22 preferably includes a plurality of axial bearing rollers 34 (e.g., needle rollers). The rollers 34 operatively engage the inner surface 28 formed by the cup 20 and a race surface 35 formed by the trunnion 16. A thrust washer 36 may be positioned in the cup 20 and configured to act as a buffer between the end surface 24 and an end surface of the trunnion 16.

The cup bearing 18 also includes a sealing assembly 38 configured to inhibit foreign material and debris from reaching the bearing element 22. The sealing assembly 38 includes a seal sub-assembly 40 and an external shield 42. The seal sub-assembly 40 is at least partially positioned in a space between the cup 20 and the trunnion 16 to block the foreign material and debris from reaching the bearing element 22 through this space. The external shield 42 is positioned outside of this space and is configured to provide additional protection against contamination by blocking foreign material and debris from even reaching the space between the cup 20 and the trunnion 16.

FIG. 3 further illustrates the sealing assembly 38 in position on the cup 20 and relative to an outer surface 44 of the trunnion 16. In an exemplary embodiment, the seal sub-assembly 40 includes an elastic sealing member 46 and a seal insert 48. The elastic sealing member 46 is configured to contact the outer surface 44 of the trunnion 16. The elastic sealing member 46 preferably includes a plurality of sealing lips 49 which are configured to resiliently and frictionally engage the outer surface 44.

The seal insert 48 is an annular connecting piece, preferably made from stamped metal, which is attached to the elastic sealing member 46. The seal insert 48 preferably includes a shape which matches the cup 20 near the rim surface 32 such that the seal insert 48 contacts the inner surface 28 and the rim surface 32. The seal insert 48 preferably includes a first axially-extending portion 50 in contact with the inner surface 28 and an extension portion 52 in contact with the rim surface 32 and extending outwardly therefrom. By extending "outwardly," the extension portion 52 extends away from the rim surface 32, toward the central body portion 14 of the cross member 12.

The extension portion 52 includes a second axially-extending portion 54 and a radially-extending portion 56 which is in contact with the rim surface 32 and connects the first axially-extending portion 50 to the second axially-extending portion 54. In this way, at least a portion of the seal insert 48 forms an S-shape which braces against two surfaces of the cup 20 (e.g., the inner surface 28 and the rim surface 32) and creates an attachment point for the external shield 42.

The external shield 42 includes a radially inner portion 58 and a radially outer portion 60. The inner portion 58 contacts the outer surface 44 of the trunnion 16, thereby creating an additional seal which helps to inhibit material from riding along the outer surface 44 and reaching the seal sub-assembly 40. The outer portion 60 is attached to the extension portion 52 of the seal insert 48. In an exemplary embodiment, the outer portion 60 is attached to the extension portion 52 by a snap fit.

As shown in FIG. 3, the second axially-extending portion 54 is preferably attached to the outer portion 60 of the external shield 52. For example, the second axially-extending portion 54 and the outer portion 60 may include mating surfaces which form a snap fit. Due to the shape of the seal insert 48, the extension portion 52 is configured to contact the rim surface 32 of the cup 20 and bridge a gap between the rim surface 32 and the outer portion 60 of the external shield 42. This bridging of the gap provides an additional seal point which inhibits foreign material and debris from reaching the space between the inner surface 28 and the outer surface 44 and allows the sealing assembly 38 to be an integrated, singular component which provides internal and external sealing. The integration of the internal and external seal components provides a sealing assembly 38 which is effective, removes variability in sealing connection, and allow for ease of assembly.

In an exemplary method of assembling the cup bearing 18, the seal sub-assembly 40 is attached to the external shield 42. For example, the outer portion 60 of the external shield 42 is attached to the extension portion 52 of the seal insert 48 (e.g., by a snap fit). In addition, the seal sub-assembly 40 is inserted into the cup 20 until the seal insert 48 contacts the inner surface 28 and the rim surface 32. The cup 20 and seal sub-assembly 40 are installed on an end of a trunnion 16.

In some embodiments, the seal sub-assembly 40 and the external shield 42 may be attached to each other before the cup 20 is installed on the end of the trunnion 16. In this way, the cup bearing 18 and the entire sealing assembly 38 is ready to be installed on an end of a trunnion 16 in one step by inserting the end of the trunnion 16 into the an outer-most opening defined by the external shield 42 and sliding the cup bearing 18 until it is in place on the trunnion 16. Moreover, the external shield 42 may be attached to the seal sub-assembly 40 prior to the seal sub-assembly 40 being inserted into the cup 20 such that attachment of both the external shield 42 and the seal sub-assembly to the cup 20 can be achieved in one step. In some embodiments, the seal sub-assembly 40 may be first inserted into the cup 20, which is then placed on an end of a trunnion 16, followed by the external shield 42 being snapped into place.

The disclosed sealing assembly provides a sealing solution which is suitable for use with thin-walled, drawn cups. The sealing assembly includes a seal insert which is adapted for direct connection to an external shield such that the entire sealing assembly is integrated as a singular piece. This simplifies assembly of the cup bearing and the universal joint and allows the sealing assembly to be used with various different types of bearings including the aforementioned bearings having thin-walled, drawn cups.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. Universal Joint
12. Cross Member
14. Central Body Portion
16. Trunnion
18. Cup Bearing
20. Cup
22. Bearing Element
24. End Surface
26. Perimeter Wall
28. Inner Surface
30. Outer Surface
32. End Surface
34. Roller
36. Thrust Washer
38. Sealing Assembly
40. Seal Sub-Assembly
42. External Shield
44. Outer Surface
46. Elastic Sealing Member
48. Seal Insert
49. Sealing Lips
50. First Axially-Extending Portion
52. Extension Portion
54. Second Axially-Extending Portion
56. Radially-Extending Portion
58. Inner Portion
60. Outer Portion

What is claimed is:

1. A sealing assembly for a cup bearing of a universal joint, the sealing assembly comprising:
a seal sub-assembly configured to be positioned in a space between a cup of the cup bearing and a trunnion of the universal joint,
the seal sub-assembly including:
an elastic sealing member configured to contact an outer surface of the trunnion; and
a seal insert attached to the elastic sealing member and configured to contact an inner surface of the cup, the seal insert including an extension portion configured to contact and extend away from a rim surface of the cup; and
an external shield including an inner portion and an outer portion, the inner portion configured to contact the outer surface of the trunnion, and the outer portion being attached to the extension portion of the seal insert by a separable snap fit.

2. The sealing assembly of claim 1, wherein the seal insert is annular and includes a first axially-extending portion, a second axially-extending portion attached to the outer portion of the external shield, and a radially-extending portion connecting the first axially-extending portion to the second axially-extending portion.

3. The sealing assembly of claim 1, wherein the seal insert is metal.

4. The sealing assembly of claim 1, wherein the elastic sealing member includes a plurality of sealing lips.

5. A cup bearing for a universal joint, comprising:
a cup including an end surface and a perimeter wall, the perimeter wall including an inner surface, an outer surface, and a rim surface;
a bearing element positioned in the cup; and
a sealing assembly, comprising:
a seal sub-assembly configured to be positioned in a space between the cup and a trunnion of the universal joint, the seal sub-assembly including:
an elastic sealing member configured to contact an outer surface of the trunnion; and
a seal insert attached to the elastic sealing member and including a first axially-extending portion in contact with the inner surface of the cup and an extension portion in contact with and extending away from the rim surface of the cup; and
an external shield including an inner portion and an outer portion, the inner portion configured to contact the outer surface of the trunnion, and the outer portion being attached to the extension portion of the seal insert.

6. The cup bearing of claim 5, wherein the outer portion of the external shield is attached to the extension portion of the seal insert by a snap fit.

7. The cup bearing of claim 5, wherein the extension portion includes a second axially-extending portion which is attached to the outer portion of the external shield and a radially-extending portion which is in contact with the rim surface and connects the first axially-extending portion to the second axially-extending portion.

8. The cup bearing of claim 7, wherein the extension portion bridges a gap between the rim surface of the cup and the outer portion of the external shield.

9. The cup bearing of claim 5, wherein the seal insert is metal.

10. The cup bearing of claim 5, wherein the elastic sealing member includes a plurality of sealing lips.

11. The cup bearing of claim 5, wherein the cup is a drawn cup.

12. The cup bearing of claim 5, wherein the bearing element includes a plurality of rollers configured to facilitate relative motion between the cup and the trunnion.

13. A method of assembling a cup bearing for a universal joint, comprising: attaching an external shield to a seal sub-assembly, the seal sub-assembly comprising an elastic sealing member and a seal insert, including attaching an outer portion of the external shield to an extension portion of the seal insert; inserting the seal sub-assembly into a cup having a perimeter wall until the seal insert contacts an inner surface and a rim surface of the perimeter wall, wherein the extension portion bridges a gap between the rim surface and the external shield.

14. The method of claim 13, wherein attaching the external shield to the extension portion is by a snap fit.

15. The method of claim 13, wherein the external shield is attached to the extension portion of the seal insert prior to the seal sub-assembly being inserted into the cup.

* * * * *